United States Patent
Beaucoup

(10) Patent No.: US 8,265,263 B2
(45) Date of Patent: Sep. 11, 2012

(54) DELAYED ADAPTATION STRUCTURE FOR IMPROVED DOUBLE-TALK IMMUNITY IN ECHO CANCELLATION DEVICES

(75) Inventor: Franck Beaucoup, Ottawa (CA)

(73) Assignee: Mitel Networks Corporation, Ottawa (CA)

( * ) Notice: Subject to any disclaimer, the term of this patent is extended or adjusted under 35 U.S.C. 154(b) by 1414 days.

(21) Appl. No.: 11/832,693

(22) Filed: Aug. 2, 2007

(65) Prior Publication Data
US 2008/0031442 A1 Feb. 7, 2008

(30) Foreign Application Priority Data

Aug. 7, 2006 (EP) .................................... 06118535

(51) Int. Cl.
*H04M 9/08* (2006.01)
*A61F 11/06* (2006.01)
*H04B 3/20* (2006.01)
*H04B 1/38* (2006.01)

(52) U.S. Cl. ........... 379/406.09; 379/406.08; 381/71.11; 370/289; 455/570

(58) Field of Classification Search ................. 704/248, 704/246
See application file for complete search history.

(56) References Cited

U.S. PATENT DOCUMENTS

| | | | |
|---|---|---|---|
| 6,430,287 B1 | 8/2002 | Rao | |
| 6,775,653 B1* | 8/2004 | Wei | 704/248 |
| 6,792,106 B1* | 9/2004 | Liu | 379/406.05 |
| 7,876,892 B1* | 1/2011 | Su et al. | 379/406.04 |
| 2004/0125943 A1* | 7/2004 | Davis | 379/406.01 |
| 2006/0140392 A1* | 6/2006 | Ahmadi | 379/406.1 |
| 2006/0147030 A1* | 7/2006 | Yeh et al. | 379/406.08 |
| 2006/0198511 A1* | 9/2006 | Su et al. | 379/406.01 |

FOREIGN PATENT DOCUMENTS
WO  WO 00/62501  10/2000

OTHER PUBLICATIONS

European Search Report from corresponding European Application No. EP 06 11 8535.
Guozhu Long et al., "The LMS Algorithm With Delayed Coefficient Adaptation." IEEE Transactions on Acoustics, Speech and Signal Processing, IEEE Inc. New York, US, vol. 27, No. 9, Sep. 1, 1989, pp. 1397-1405, XP000054414, ISSN: 0096-3518.
Zerguine A.; Cowan C F N; Bettayeb M, "Adaptive Echo Cancellation Using Statistical Shaping." Conference Record of the Twenty-Ninth Asilomar Conference on Signals, Systems and Computer, Oct. 30, 1995 Nov. 2, 1995, pp. 468-472, XP002420534.

* cited by examiner

*Primary Examiner* — Fan Tsang
*Assistant Examiner* — Jeffrey Lytle

(57) ABSTRACT

In a system having an adaptive filter block for receiving a reference signal and adapting to an input signal, and a block for detecting corruption of the input signal by an interference signal and in response limiting adaptation of the adaptive filter block, the improvement comprising delaying and applying the input signal to the adaptive filter block while applying the input signal to the block for detecting corruption without delay.

9 Claims, 2 Drawing Sheets

DELAYED ADAPTATION STRUCTURE FOR IMPROVED DOUBLE-TALK IMMUNITY IN ECHO CANCELLATION DEVICES

CROSS-REFERENCE TO RELATED PATENT APPLICATION

This application claims priority under 35 U.S.C. §119 from European Patent Application No. 06118535.1, filed on Aug. 7, 2006, the disclosure of which is hereby incorporated by reference herein as if set forth in its entirety.

BACKGROUND OF THE INVENTION

1. Field of the Invention

The present invention relates generally to telecommunications and in particular to echo cancellation/suppression and double-talk detection in communication paths.

2. Description of the Related Art

Adaptive echo cancellers have been used for several decades to cancel line echoes generated by hybrid transformers in telephone networks, as well as acoustic echoes generated by the reflection of loudspeaker signals back into the microphone in hands-free communication devices (see J. Benesty et. al., "Advances in network and acoustic echo cancellation," Springer, 2001, and E. Hansler, G. Schmidt, "Acoustic echo and noise control, a practical approach," Wiley, 2004).

Recently, the use of speech coding in telephone networks and the emergence of packet-based telephony have contributed to increased delay in telephone communications. This increased delay has exacerbated the echo effects and therefore created a need for better echo cancellers.

One known problem in echo cancellation algorithms pertains to divergence during so-called "double-talk" periods where both parties involved in the communication talk simultaneously. If left to adapt, the echo canceller treats the interfering double-talk signal as echo, resulting in severe misalignment of its adaptive filter and serious degradation of its performance.

Historically, the most prevalent technique used in echo cancellers to avoid divergence during double-talk has been the use of double-talk detection (DTD) algorithms that detect double-talk and freeze (or slow down significantly) adaptation during these intervals. Double-talk detectors have been the subject of intense research at the academic level as well as in the industrial world, leading to many publications (see U.S. Pat. Nos. 6,775,653; 6,804,203; 6,944,288 and S. Gay and J. Benesty, "Acoustic signal processing for telecommunication," Kluwer, 2000). Such prior art DTD algorithms range from simple energy-based algorithms, such as the Geigel algorithm (see D. L. Duttweiler, "A twelve-channel digital echo canceller," *IEEE Trans. Commun.*, vol. 26, pp 647-653, May 1978), to advanced algorithms such as the normalized cross-correlation DTD (see J. Benesty, D. R. Morgan, and J. H. Cho, "A new class of doubletalk detectors based on cross-correlation," *IEEE Trans. Speech Audio Processing*, March 2000), or frequency-domain coherence DTD (see T. Gansler, M. Hansson, C. J. Ivarsson and G. Salomonsson, "A double-talk detector based on coherence," *IEEE Trans. Commun.*, vol. 44, pp. 1421-1427, November 1996).

As a general rule, the algorithms that offer the best performance in terms of detection rate and reliability use some sort of time averaging to infer their decision, and therefore tend to present some latency in triggering signals to freeze the echo canceller adaptation. As a result, some divergence can still occur at the beginning of double-talk intervals, which can be detrimental to the quality of the communication.

K. Ochiai, T. Araseki and T. Ogihara, "Echo canceller with two echo path models," *IEEE Trans. Commun.*, vol. COM-25, pp 589-595, June 1977, set forth a twin-filter structure to protect echo cancellers against divergence during double-talk. Two transversal filters are set forth for implementing the twin-filter structure, one of which is adaptive while the other is fixed. An alternative twin-filter structure is set forth in J. Liu, "A Novel Adaptation Scheme in the NLMS Algorithm for Echo Cancellation," *IEEE Signal Processing Letters*, Vol. 8, No. 1, pp. 20-22, January 2001, where the fixed filter is replaced by a very slowly adaptive filter. In either case, the fixed (or slowly adapting) filter is updated with the contents of the adaptive filter when there is a high level of certainty that the adaptive filter outperforms the fixed (or slowly adapting) filter in terms of echo cancellation. Many variants of the twin-filter structure have been proposed (see, for example, U.S. Pat. No. 6,947,549 and the adaptation scheme set forth in J. Liu, discussed above). One general problem with these prior art structures is that they require at least one extra filtering operation, as well as a second memory buffer to store the coefficients of the second filter.

SUMMARY OF THE INVENTION

It is an aspect of the present invention to provide an echo cancellation structure that improves the immunity of echo cancellers to the problem of divergence during double talk without suffering from large memory requirements associated with prior art twin-filter structures.

More particularly, an echo canceller structure is set forth wherein the adaptation process is delayed so that the DTD algorithm operates on "look-ahead" data, thereby avoiding the DTD trigger latency effect discussed above. Nonetheless, the echo canceller of the preferred embodiment does not introduce delay in the actual signal path and therefore there is no adverse effect on the main convergence properties of the adaptation process.

The above aspects can be attained by a system having an adaptive filter block for receiving a reference signal and adapting to an input signal, and a block for detecting corruption of the input signal by an interference signal and in response limiting adaptation of the adaptive filter block wherein a delayed version of the input signal is applied to the adaptive filter block while the input signal is applied to the block for detecting corruption without delay.

According to another aspect, an echo canceller is provided, comprising a first delay for receiving a reference signal and generating a delayed version thereof, a second delay for receiving an input signal that contains an echo of the reference signal and that has been corrupted by an interference signal, and generating a delayed version thereof, a twin adaptive filter for receiving the reference signal, the delayed version thereof, and the delayed version of the input signal and in response generating an echo estimate signal adapted to the input signal, wherein the filter adapts to the input signal based on the delayed version of the reference signal and a feedback error signal, a first subtractor for subtracting the echo estimate signal from the delayed version of the input signal and in response generating the feedback error signal, a second subtractor for subtracting the echo estimate signal from the input signal and in response generating an output signal, and a further block for detecting corruption of the input signal by the interference signal and in response limiting adaptation of the adaptive filter block.

DETAILED DESCRIPTION OF THE PREFERRED EMBODIMENTS

Figure 1:
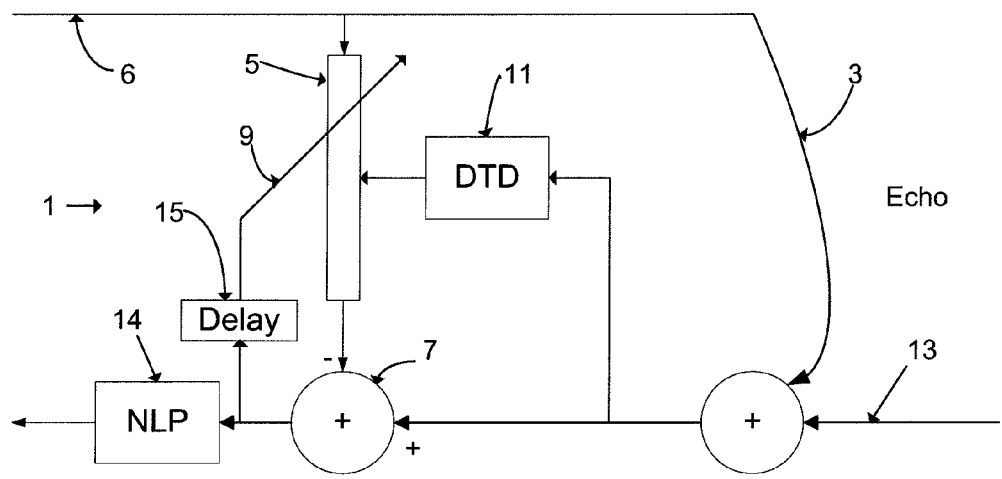
FIG. 1 is a block diagram of a prior art echo canceller conforming to the delayed LMS (Least-Mean-Squared) algorithm.

With reference to FIG. 1, a prior art echo canceller structure is shown for addressing the prior art problem of trigger latency in echo cancellers incorporating a DTD algorithm. Echo canceller 1 attempts to model the transfer function of the echo path 3 by means of an adaptive filter 5. A reference signal 6 is applied to the input of the filter 5 and to the associated echo path 3 such that the estimated echo can be canceled by simply subtracting the estimated echo signal which passes through the echo canceller from the input signal received at subtractor 7. If the transfer function of the model of the echo path is exactly the same as the transfer function of the echo path 3, the echo signal component is completely canceled (i.e. the error signal 9 will be zero). The error signal is used for adaptation, so that the echo canceller converges to the correct transfer function. Typically, an algorithm such as the LMS (Least-Mean-Squared) algorithm is used to approximate the echo path.

A double-talk detector 11 is used to detect double-talk 13, and in response freeze the adaptation of echo canceller 1, as is known in the art. A non-linear processor (NLP) block 14 functions to remove the residual echo left after echo cancellation, as is known in the art and described, for example, in J. Benesty et al. referred to above.

In order to introduce some delay in the adaptation, a delay 15 is introduced in the feedback path of the error signal to the adaptive filter 5. This corresponds to the well-known delayed LMS algorithm (see G. Long, F. Ling, J. G. Proakis, "The LMS algorithm with delayed coefficient adaptation," *IEEE Trans. Ac., Speech and Sig. Proc.*, vol. 37 (9), pp 1397-1405, September 1989). However, since filter coefficient updating is performed with an error signal that does not correspond to current filter coefficients, but rather to an older version, non-optimal convergence characteristics may result (the stability bound for the adaptation step-size is smaller than for the LMS algorithm). In P. Kabal, "The stability of adaptive minimum mean square error equalisers using delayed adjustment," *IEEE Trans. Commun.*, vol. 31, pp 430-432, March 1983, an explicit bound is derived on the adaptation step size for stable operation of the delayed NLMS algorithm. For delays in the order of a few milliseconds, the stability bound is very small compared to that of NLMS, making the structure of FIG. 1 impractical for many echo cancellation applications.

Figure 2:
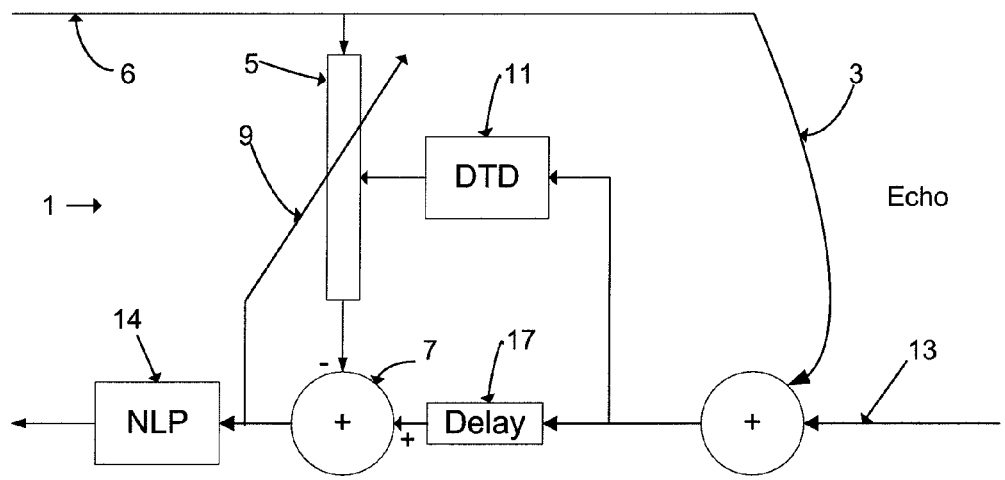
FIG. 2 is a block diagram of an echo canceller according to a first aspect of the invention.

In the embodiment of FIG. 2, a delay 17 is introduced so that the DTD algorithm 11 operates on look-ahead data relative to echo canceller 1. Provided that the delay is longer than the time it takes to trigger at the beginning of a double-talk burst (typically a few milliseconds) and that a corresponding latency is introduced when transitioning from "freeze" to "adapt" decisions, the structure of FIG. 1 provides an acceptable solution to the problem of echo canceller divergence during double talk. However, from a user perspective, the delay introduced in the signal path may be perceived as affecting the quality of communication and may make echo artifacts more noticeable.

Figure 3:
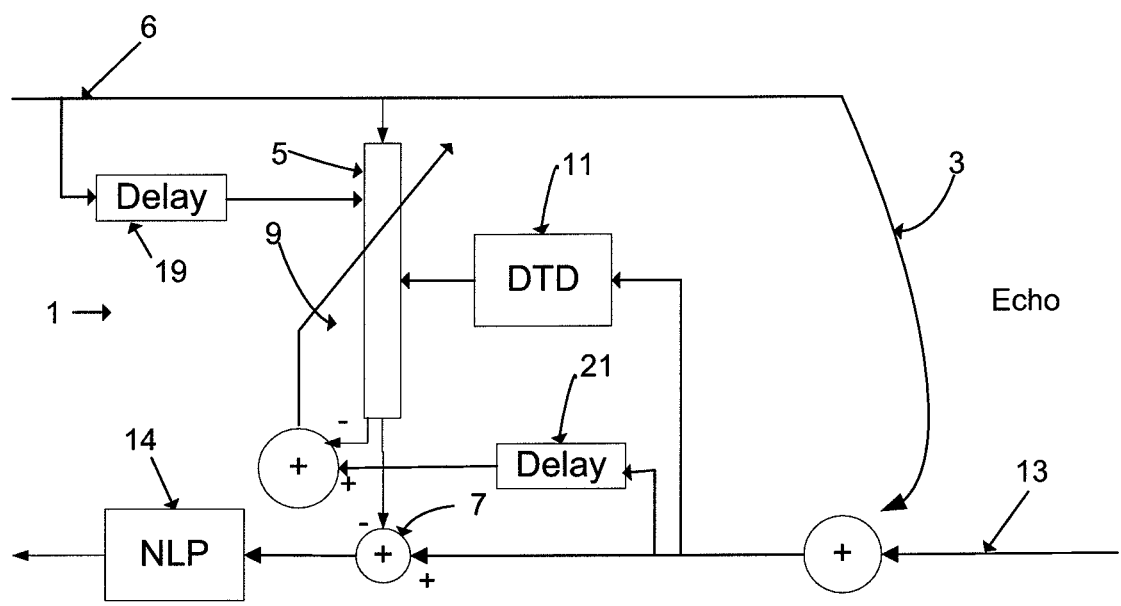
FIG. 3 is a block diagram of an echo canceller according to a preferred embodiment of the invention.

From a consideration of the prior art approach of FIG. 1 and the inventive embodiment of FIG. 2, a further alternative approach to ensure good convergence properties while still delaying the adaptation but not the signal itself, is to carry out two filtering operations in parallel, with the same filter 5 but different versions of the reference signal 6 (one version being delayed via 19), as shown in the preferred embodiment of FIG. 3. The non-delayed error sample output from subtractor 7 is fed to the NLP block 14. A delayed echo replica output from delay 21 is applied to a further subtractor 22 from which the output of adaptive filter 5 is subtracted to create error signal 9 to drive the adaptation, subject to the DTD decisions made with non-delayed data.

The structure of FIG. 3 solves the prior art DTD latency problem without introducing delay in the signal path and with a smaller memory footprint than prior art twin-filter structures since only short additional buffers 19 and 21 required to delay the reference and input signals, respectively. As in prior-art twin-filter structures, the only penalty in terms of convergence speed is a fixed delay (typically in the order of a few milliseconds) in the adaptation of filter 5.

The embodiment of FIG. 3 has been described with respect to the input signal being fed to the double-talk detection block 11. Variations in design are possible with respect to which signals are fed to this block (e.g. reference signal 6, error signal 9, etc) as well as with respect to the exact internal structure of the block 11 and its interfaces to the adaptive filter 5. Any echo cancellation structure that introduces delay in the adaptation process and performs multiple filtering operations with the adaptive tap-weight vector so as to avoid signal-path delay and conserve the convergence properties of the adaptation process, fall within the scope of the present invention.

The many features and advantages of the invention are apparent from the detailed specification and, thus, it is intended by the appended claims to cover all such features and advantages of the invention that fall within the true sphere and scope of the invention.

For example, although the invention has been described in the context of echo cancellation for telephony applications, the principles thereof may be applied to any application using adaptive echo cancellation, and more generally, to any application using adaptive system identification where the desired signal for the adaptive process can be corrupted by an interference signal.

Since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. In a system having an adaptive filter block for receiving a reference signal and adapting to an input signal, and a block for detecting corruption of said input signal by an interference signal and in response limiting adaptation of said adaptive filter block, the improvement comprising applying said input signal to said block for detecting corruption while delaying and applying said input signal to said adaptive filter block, and applying a delayed version of the reference signal in parallel with the reference signal to the adaptive filter block.

2. An echo canceller comprising:
a first delay for receiving a reference signal and generating a delayed version thereof;
a second delay for receiving an input signal that contains an echo of said reference signal and that has been corrupted by an interference signal, and generating a delayed version thereof;
an adaptive filter for receiving said reference signal, said delayed version thereof, and said delayed version of said input signal and in response generating an echo estimate signal adapted to said input signal, wherein said filter adapts to said input signal based on the delayed version of said reference signal and a feedback error signal calculated from said delayed version of the input signal;
a first subtractor for subtracting said echo estimate signal from said delayed version of said input signal and in response generating said feedback error signal;
a second subtractor for subtracting said echo estimate signal from said input signal and in response generating an output signal; and
a further block for detecting corruption of said input signal by said interference signal and in response limiting adaptation of said adaptive fitter block,
wherein said delayed version of said reference signal is applied in parallel with said reference signal to the adaptive filter.

3. The echo canceller of claim 2, wherein said further block comprises a double-talk detector.

4. The echo canceller of claim 2, wherein said adaptive filter comprises a Least Mean Square (LMS) fitter.

5. The echo canceller of claim 2, further comprising a Non-Linear Processor (NLP) for receiving said output signal and in response removing residual echo there from.

6. A method of echo cancellation comprising:
receiving a reference signal and generating a delayed version thereof;
receiving an input signal and generating a delayed version thereof;
applying said reference signal, said delayed version thereof, and said delayed version of said input signal to an adaptive filter block;
generating an echo estimate signal adapted to said input signal, wherein said filter adapts to said input signal based on the delayed version of said reference signal and a feedback error signal calculated from said delayed version of the input signal;
subtracting said echo estimate signal from said delayed version of said input signal and in response generating said feedback error signal;
subtracting said echo estimate signal from said input signal and in response generating an output signal; and
detecting corruption of said input signal by said interference signal and in response limiting adaptation of said adaptive filter block,
wherein said delayed version of said reference signal is applied in parallel with said reference signal to the adaptive filter block.

7. The method of claim 6, wherein said detecting comprises detecting double-talk.

8. The method of claim 6, wherein said adaptive filter comprises a Least Mean Square filter.

9. The method of claim 6 further comprising, receiving said output signal and, in response, removing residual echo there from.

* * * * *